(No Model.)
A. R. LEEDS.
AUTOMATIC RELIEF VALVE IN WATER SUPPLY PIPES.
No. 327,091. Patented Sept. 29, 1885.
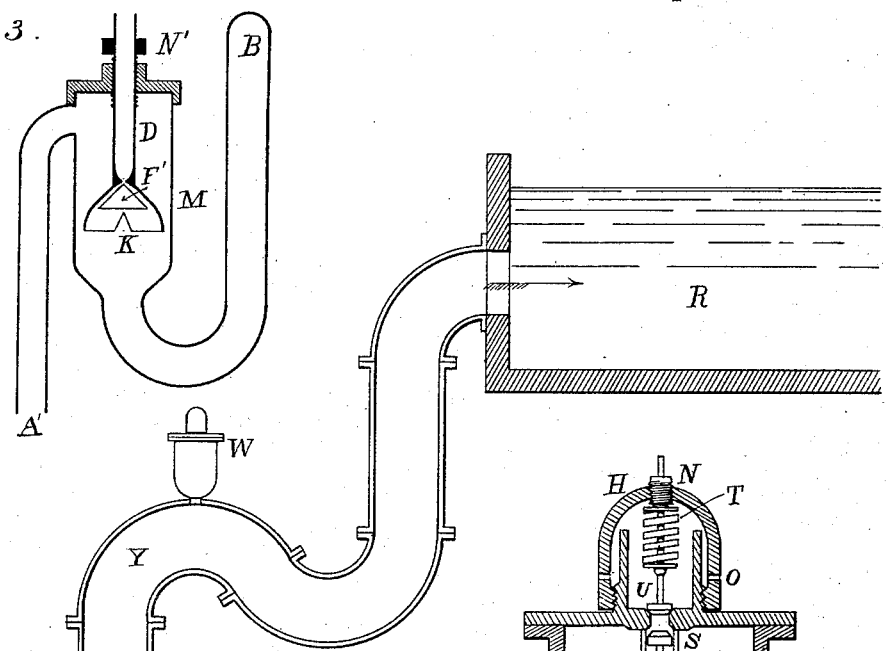
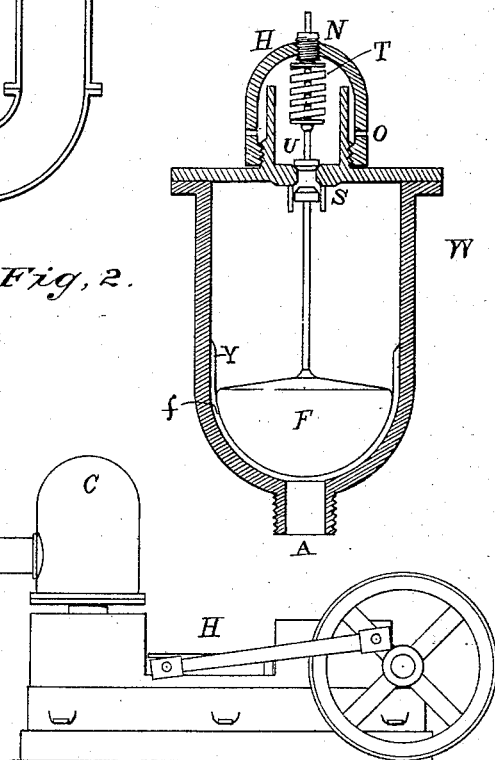
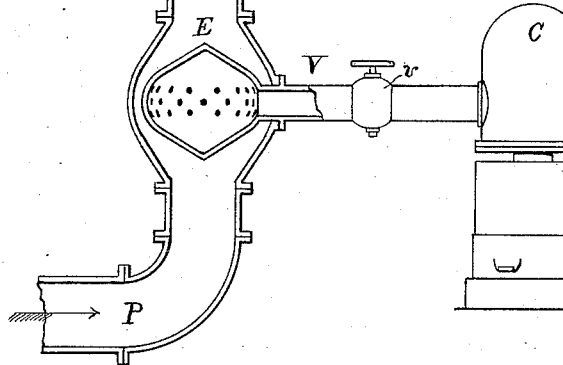
WITNESSES
Geo. W. Young.
Henry A. Lamb.
INVENTOR
Albert R. Leeds.
By his Attorneys
Janney & Skinkle.

United States Patent Office.

ALBERT R. LEEDS, OF HOBOKEN, NEW JERSEY.

AUTOMATIC RELIEF-VALVE IN WATER-SUPPLY PIPES.

SPECIFICATION forming part of Letters Patent No. 327,091, dated September 29, 1885.

Application filed February 27, 1885. (No model.)

*To all whom it may concern:*

Be it known that I, ALBERT R. LEEDS, a citizen of the United States, residing at Hoboken, in the county of Hudson and State of New Jersey, have invented certain new and useful Improvements in Automatic Relief-Valves in Water-Supply Pipes, of which the following is a specification, reference being had to the accompanying drawings.

The present invention relates to an improvement in apparatus for the purification of water by means of oxygen forced into solution therewith; and it consists more especially in means for allowing the escape of vitiated gases from the conveying-pipes, and also for relieving excess of pressure, whether of the air, gas, or water, whenever the same reaches a point liable to cause injury to the pipes.

The object of my system being to cause the absorption by a column of water of a large quantity of oxygen from air forced into the column of water, I do not of course propose to permit the escape of aeriform fluid from the conveying-pipes until the air and water have traveled far enough to effect the solution of all the oxygen practicable under the desired conditions, which are usually such as exist in the main conveying-pipes, used to carry water from the source of supply or from the point of greatest pressure to the distributing-pipes of a city.

In the accompanying drawings, Figure 1 is an elevation, partly in section, illustrating theoretical apparatus embodying my invention. Figs. 2 and 3 are detail views showing the construction of the automatic valves.

Y represents the summit of one of the undulations formed by following the surface of the country through which the conveying-pipe passes, and which are the only points at which gases accumulate to any great extent. For the sake of illustration I have only shown one such point, as in practice the minor curvatures may be entirely disregarded.

The pipe P is supplied with water under pressure from any suitable source of supply. The pipe V supplies air under pressure, and is provided with suitable check-valve or cock, *v*.

At the point Y, which, as before stated, should be far enough from the pumping-station to allow all the practicable mixing to take place, I insert a combination-valve, constructed substantially as follows:

W is an automatic valve, which consists of a cylindrical chamber communicating with the interior of the water-conveying pipes by the passage A. The bottom of this chamber is formed or provided with two ribs, *y*, one only of which is represented in the drawings, and upon which a float, F, rests, when not in action, without preventing the free passage of air through spaces *f*, existing between the projecting ribs and the body of the float. The float F is provided with a rod terminating in a conical head, which fits into a proper valve-seat. (Represented at S.) Another rod, with similar conical head and valve-seat, is shown at U, this head being forced down into its valve-seat by means of a spiral spring, T, the tension of which is regulated by means of the nut N, passing through the dome or top of the chamber H. Openings O are made in this dome for the escape of air.

The operation of these valves is as follows: The valve U being closed by the pressure exerted through the spiral, all air which passes through the spaces left between the projecting ribs and the float F is confined within the chamber until its pressure is great enough to raise the valve U, and so make its escape. The water which follows it then raises the float F and closes the valve S, thus preventing the escape of water. When a new supply of air accumulates, it drives the water back until it is no longer able to support the float F, which then drops and opens the valve S. Instead of the spiral T, weights may be used to obtain the required amount of pressure upon the valve U.

Instead of the contrivance above described, a mercury-valve, as represented in drawings, may be employed. This valve communicates, by means of the pipe A', with the interior of the main water-conveying pipe. The pipe A' communicates with the chamber M, and this chamber with a pipe, B, closed at its upper end. Through the top of the chamber M a pipe, D, passes for the escape of air, this pipe being capable of being raised and lowered by the screw and nut at N'. The air-pipe D terminates below in a bell-shaped opening with a conical slit in its periphery K. Into this bell-shaped opening there fits a conical rubber float, F'.

The operation of the valve is as follows: Mercury is poured into the chamber M until it rises above the conical slit in the bell K, filling at the same time a portion of the tube B. Then, as excess of air enters into the chambers M, it first drives the mercury up into the bell K until the float F' rises and closes the opening into the pipe D. Then, as the pressure increases, the mercury is depressed in the chamber M and raised in the pipe B until its level falls below the top of the slit in K, when the air enters the bell, allows the float F' to fall, and makes its escape through D. The bell K and the pipe D are so adjusted that the air makes its escape at a certain pressure; but the water is prevented from escape at the lower pressure incident upon the escape of the excess of air.

It will be obvious that many forms of valve can be adapted to produce the herein-described effect without departing from the spirit of my invention; and I also contemplate using simple loaded valves of the nature of the well-known "safety-valve" in many places where it is desirable to provide for the safety of the pipe without allowing the escape of air.

I sometimes desire to introduce a second charge of air into the pipe Q at a point remote from the first pumping-station, and in order to accomplish this it is desirable to allow the escape of all gases in the water at that point, which is readily effected by means of the valves already described.

What I claim, and desire to secure by Letters Patent, is—

1. The combination, with a main conveying-pipe and means for supplying air and water under pressure thereinto, of the valve-chamber W, having inlet and outlet apertures, a floating valve adapted to be raised by the pressure of water and to close the outlet-aperture, and an adjustable loaded valve arranged to permit the escape of air under pressure exceeding the normal pressure within the conveying-pipe, substantially as set forth.

2. The combination, with a water-pipe or the like having controlled connections, a water-supply under pressure, and an air-supply also under pressure, of a series of blow-offs adapted to allow the escape of gases only, and at a pressure exceeding that of the atmosphere, and an additional valve loaded to resist a certain pressure and adapted to allow the escape of water and connected with the interior of such pipes, whereby the water is retained within the pipes at the desired pressure, and the vitiated air and gases are automatically carried off, as set forth.

In testimony whereof I hereto affix my signature in presence of two witnesses.

ALBERT R. LEEDS.

Witnesses:
 RUD. BECHERT,
 WILHELM KARLE.